United States Patent
Wang et al.

(10) Patent No.: US 11,847,164 B2
(45) Date of Patent: Dec. 19, 2023

(54) METHOD, ELECTRONIC DEVICE AND STORAGE MEDIUM FOR GENERATING INFORMATION

(71) Applicant: Beijing Baidu Netcom Science and Technology Co., Ltd., Beijing (CN)

(72) Inventors: Shu Wang, Beijing (CN); Kexin Ren, Beijing (CN); Xiaohan Zhang, Beijing (CN); Zhifan Feng, Beijing (CN); Chunguang Chai, Beijing (CN); Yong Zhu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 433 days.

(21) Appl. No.: 17/213,940

(22) Filed: Mar. 26, 2021

(65) Prior Publication Data
US 2021/0216717 A1    Jul. 15, 2021

(30) Foreign Application Priority Data
Apr. 15, 2020  (CN) .......................... 202010297146.2

(51) Int. Cl.
*G06F 17/00*    (2019.01)
*G06F 16/78*    (2019.01)
(Continued)

(52) U.S. Cl.
CPC .......... *G06F 16/78* (2019.01); *G06F 16/3344* (2019.01); *G06F 40/295* (2020.01);
(Continued)

(58) Field of Classification Search
None
See application file for complete search history.

(56) References Cited

U.S. PATENT DOCUMENTS

2014/0282219 A1* 9/2014 Haddock ................. G06F 16/22
                                                    715/781
2017/0371871 A1* 12/2017 Calhoun ................. G06F 16/43
(Continued)

FOREIGN PATENT DOCUMENTS

CN      110245259 A    9/2019
CN      110427563 A    11/2019
(Continued)

OTHER PUBLICATIONS

CN Office Action dated Feb. 10, 2023, in ApplicationNo. CN202010297146.2.
(Continued)

*Primary Examiner* — Satwant K Singh
(74) *Attorney, Agent, or Firm* — Weaver Austin Villeneuve & Sampson LLP

(57) ABSTRACT

A method, electronic device and storage medium for generating information are disclosed. The method includes: acquiring a plurality of tag entity words from a target video, the tag entity words including a person entity word, a work entity word, a video category entity word, and a video core entity word, the video core entity word including an entity word for characterizing a content related to the target video; linking, for a tag entity word among the plurality of tag entity words, the tag entity word to a node of a preset knowledge graph; determining semantic information of the target video based on a linking result of each of the tag entity words; and structuring the semantic information of the target video based on a relationship between the node and an edge of the knowledge graph, to obtain structured semantic information of the target video.

16 Claims, 4 Drawing Sheets

(51) Int. Cl.
  *G06F 16/33* (2019.01)
  *G06F 40/295* (2020.01)
  *G06F 40/30* (2020.01)
  *G06N 3/08* (2023.01)
  *G06V 20/40* (2022.01)
  *G06V 40/16* (2022.01)
  *G06V 10/764* (2022.01)
  *G06V 10/82* (2022.01)

(52) U.S. Cl.
  CPC ............. *G06F 40/30* (2020.01); *G06N 3/08* (2013.01); *G06V 10/764* (2022.01); *G06V 10/82* (2022.01); *G06V 20/46* (2022.01); *G06V 20/48* (2022.01); *G06V 40/172* (2022.01)

(56) References Cited

U.S. PATENT DOCUMENTS

| | | | |
|---|---|---|---|
| 2019/0012377 A1 | 1/2019 | Liu et al. | |
| 2019/0332867 A1 | 10/2019 | Zhang et al. | |
| 2019/0340255 A1* | 11/2019 | Huyghe | G06F 40/284 |
| 2021/0064692 A1* | 3/2021 | Srinivasan | G06F 40/56 |
| 2021/0089598 A1* | 3/2021 | Jeong | G06F 16/9024 |
| 2023/0077849 A1* | 3/2023 | Xu | G06V 20/46 382/190 |

FOREIGN PATENT DOCUMENTS

| | | |
|---|---|---|
| JP | 2008134966 A | 6/2008 |
| JP | 2011118803 A | 6/2011 |
| JP | 2019074843 A | 5/2019 |
| WO | WO-2020243116 A1 * | 12/2020 |

OTHER PUBLICATIONS

Chen, Jiaying et al., "A Feature Extraction Based Recommender Algorithm Fusing Semantic Analysis", Journal of Computer Research and Development, vol. 57, No. 3, 2020, pp. 562-575.

Gao et al., "Watch, Think and Attend: End-to-End Video Classification Via Dynamic Knowledge Eveolution Modeling," National Lab of Pattern Recognition, Institute of Automation, CAS, Beijing 100190, China, University of Chinese Academy of Sciences, MM'18, Oct. 22-26, 2018, Seoul, Republic of Korea, 10 pages.

Yuan et al., "End-to-End Video Classification with Knowledge Graphs," Institute for Infocomm Reseach, Singapore, 2018, 9 pages.

European Search Report dated Sep. 1, 2021 issued in EP Application No. 21165605.3.

Tongyang, Xu., et al., "Video Retrieval Research Visual Analysis," Computer Engineering and Applications, 2017, vol. 53(22), pp. 190-197.

Zhi-Hong, Xu., et al., "Video Recommendation Algorithm Based On Knowledge Reasoning Of Knowledge Graph," Computer Engineering and Design, 2020, vol. 41(3), pp. 710-715.

Zhu, X., et al., "Video-to-Shot Tag Propagation by Graph Sparse Group Lasso," IEEE Transactions on Multimedia, 2013, vol. 15(3), pp. 633-646.

Japanese Office Action dated May 17, 2022 issued in JP Application No. 2021-051976, no English translation.

* cited by examiner

METHOD, ELECTRONIC DEVICE AND STORAGE MEDIUM FOR GENERATING INFORMATION

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

Embodiments of the present disclosure relate to the field of computer technology, and specifically to the field of knowledge graph technology.

BACKGROUND

With the increase of video resources on the Internet, there are more and more video-related products, such as video recommendation and video search.

In related technologies, a video tag technology is generally used in video search or video recommendation to set a corresponding tag for a video resource. Then, a video is recommended based on the tag, or an index is established based on the tag, to implement video recommendation or search. Generally, a video tag is flat and unstructured, and the video tag neither includes semantic information of the video, nor is applicable for video recommendation, search, or the like.

SUMMARY

The present disclosure provides a method, apparatus, electronic device, and storage medium for generating information.

According to a first aspect, a method for generating information is provided. The method includes: acquiring a plurality of tag entity words from a target video, the tag entity words including a person entity word, a work entity word, a video category entity word, and a video core entity word, the video core entity word including an entity word for characterizing a content related to the target video; linking, for a tag entity word among the plurality of tag entity words, the tag entity word to a node of a preset knowledge graph; determining semantic information of the target video based on a linking result of each of the tag entity words; and structuring the semantic information of the target video based on a relationship between the node and an edge of the knowledge graph, to obtain structured semantic information of the target video.

According to a second aspect, an apparatus for generating information is provided. The apparatus includes: an acquiring unit configured to acquire a plurality of tag entity words from a target video, the tag entity words including a person entity word, a work entity word, a video category entity word, and a video core entity word, the video core entity word including an entity word for characterizing a content related to the target video; a linking unit configured to link, for a tag entity word among the plurality of tag entity words, the tag entity word to a node of a preset knowledge graph; a determining unit configured to determine semantic information of the target video based on a linking result of each of the tag entity words; and a structuring unit configured to structure the semantic information of the target video based on a relationship between the node and an edge of the knowledge graph, to obtain structured semantic information of the target video.

According to a third aspect, an electronic device is provided. The electronic device includes: at least one processor; and a memory communicatively connected to the at least one processor; where the memory stores instructions executable by the at least one processor, and the instructions are executed by the at least one processor, such that the at least one processor can execute the above method.

According to a fourth aspect, a non-transient computer-readable storage medium storing computer instructions is provided, where the computer instructions are used for causing a computer to execute the above method.

The technology according to the present disclosure solves the problem that a video tag is not applicable for video recommendation, search, and the like because the video tag is unstructured and lacks semantic information, and improves the efficiency and accuracy of a video in recommendation, search, and the like.

It should be understood that contents described in the SUMMARY are neither intended to identify key or important features of embodiments of the present disclosure, nor intended to limit the scope of the present disclosure. Other features of the present disclosure will become readily understood in conjunction with the following description.

BRIEF DESCRIPTION OF THE DRAWINGS

The accompanying drawings are used for better understanding of the present solution, and do not impose a limitation on the present disclosure. In the figures.

DETAILED DESCRIPTION OF EMBODIMENTS

Example embodiments of the present disclosure are described below with reference to the accompanying drawings, including various details of the embodiments of the present disclosure to contribute to understanding, which should be considered merely as examples. Therefore, those of ordinary skills in the art should realize that various alterations and modifications can be made to the embodiments described here without departing from the scope and spirit of the present disclosure. Similarly, for clearness and conciseness, descriptions of well-known functions and structures are omitted in the following description.

It should be noted that some embodiments in the present disclosure and some features in the embodiments may be combined with each other on a non-conflict basis. The present disclosure will be described in detail below with reference to the accompanying drawings and in combination with the embodiments.

Figure 1:
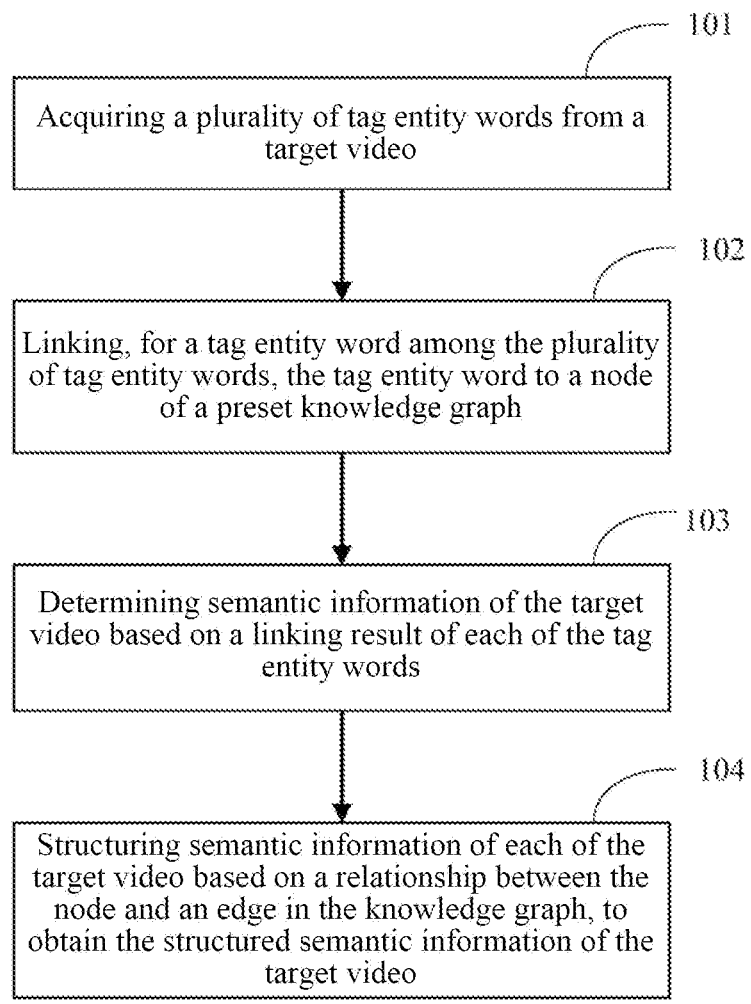
FIG. 1 is a schematic diagram of a method for generating information according to a first embodiment of the present disclosure.

Referring to FIG. 1, a schematic diagram of a method for generating information according to a first embodiment of the present disclosure is shown. The method for generating information may include the following steps:

Step 101: acquiring a plurality of tag entity words from a target video.

In the present embodiment, an executing body of the method for generating information may be an apparatus for generating information, and the apparatus for generating information may be an electronic entity (e.g., a server), or may be an application integrated with software. When in use, the target video may be inputted into the apparatus for generating information. The apparatus for generating information can generate structured semantic information of the target video using the method for generating information of the present embodiment.

In the present embodiment, the executing body may acquire the tag entity words from the target video by various approaches. The tag entity words can reflect the target video from the levels of cognition and perception. As an example, the executing body can input the target video into a pre-trained entity word acquiring model to obtain the tag entity words of the target video, and the entity word acquiring model may be used for characterizing a corresponding relationship between the target video and the tag entity words. Of course, the executing body may also acquire the tag entity words of the target video by other approaches.

Specifically, the tag entity words at least may include a person entity word, a work entity word, a video category entity word, and a video core entity word. The person entity word may be used for indicating a person (e.g., Andy Lau) appearing in the target video. The work entity word may be used for indicating a title of a work to which the target video belongs or a title of a work of the target video (e.g., Infernal Affairs). The video category entity word may be used for characterizing a category of the target video, where the category may include films and videos, Hong Kong and Taiwan movies, variety shows in mainland China, cartoons made in China, and the like. The video core entity word may include an entity word for characterizing a content related to the target video. For example, the video core entity word may include a music name of a music appearing in the target video, a singer of the music, a cartoon character, and the like.

Step 102: linking, for a tag entity word among the plurality of tag entity words, the tag entity word to a node of a preset knowledge graph.

In the present embodiment, the preset knowledge graph (KG) may be a known knowledge graph in existing technologies. The knowledge graph may include a plurality of nodes (or point), and there are still connected edges between some of the nodes. Based on the plurality of tag entity words acquired in step 101, the executing body can link, for any tag entity word among the plurality of tag entity words, the tag entity word to a node of the knowledge graph, such that each entity word among the plurality of tag entity words can be connected to the node of the knowledge graph. It is understandable that the linking the tag entity word to the node of the knowledge graph may refer to mapping a character string of the tag entity word to a corresponding node of the knowledge graph.

The knowledge graph is essentially a semantic network, and is a graph-based data structure composed of nodes and edges. In the knowledge graph, each node denotes a thing that is distinguishable and standalone, and each edge denotes a relationship between nodes. The thing in the node may be a person, a city, a plant, a commodity, or the like. The knowledge graph is an effective way of denoting a relationship, and is intended to describe various things and relationships thereof in the real world. Therefore, the linking the tag entity word to the node of the knowledge graph can acquire semantic information of the tag entity word based on a relationship between the node and an edge.

In some alternative implementations of the present embodiment, after the linking the tag entity word to the node of the knowledge graph, the executing body can check each tag entity word using the knowledge graph, thereby determining whether there is a tag entity word irrelevant to the target video among the plurality of tag entity words. Specifically, the executing body can determine whether there is an irrelevant entity word among the tag entity words based on a linking result of each tag entity word in the knowledge graph. The irrelevant entity word here may be an entity word irrelevant to the target video among the plurality of tag entity words. For example, the target video is a fragment of a movie "Infernal Affairs." Tag entity words acquired by the executing body include a person entity word "Jacky Chehung," and after the person entity word is linked to a node "Jacky Chehung" of the knowledge graph, "Jacky Chehung" can be determined to be irrelevant to the target video based on a relationship between the node and an edge. In this case, the person entity word can be determined to be a tag entity word irrelevant to the target video. It is understandable that the executing body can delete the irrelevant entity word after determining that the tag entity word is an irrelevant entity word. According to the solution provided in this implementation, the acquired tag entity words can be checked using the knowledge graph, and entity words irrelevant to the target video can be deleted from the tag entity words, thereby improving the accuracy of structured semantic information of the target video.

Step 103: determining semantic information of the target video based on a linking result of each of the tag entity words.

In the present embodiment, the executing body can acquire the linking result of step 102, and can determine semantic information of each tag entity word using the linking result of each tag entity word according to a link node of each tag entity word of the knowledge graph, and edges and nodes connected to the node. Here, the semantic information of each tag entity word may be determined as the semantic information of the target video. As an example, the tag entity word is the person entity word "Andy Lau." After linking the person entity word to a node of the knowledge graph, the executing body can acquire information included in the node and information included in a node connected to the node through an edge, e.g., identity information, representative work information, and the like of Andy Lau. Such information is semantic information of the person entity word.

In some alternative implementations of the present embodiment, the executing body can implement the above step 103 as follows: acquiring attribute information of each tag entity word based on the linking result of each tag entity word; extending each tag entity word as per a relationship between edges of the knowledge graph based on the linking result of each tag entity word, to obtain extended information of the target video; and determining the attribute information of each tag entity word and the extended information as the semantic information of the target video. This implementation can obtain, using the linking result of each tag entity word, the attribute information of each tag entity word (e.g., the tag entity word includes a person entity word and a work entity word, attribute information of the person entity word may include identity information, representative work information, and the like of a person, and attribute information of the work entity word may include time information, actor information, and the like of a work). Then, the executing body can perform information extension on each tag entity word as per a relationship between the edge and the node of the knowledge graph based on the linking result of each tag entity word, thereby obtaining extended information. For example, the tag entity words may include the person entity word (Andy Lau) and the work entity word (Infernal Affairs), and information extension on the two tag entity words can be performed as per the relationship between the nodes and the edges of the linking result of the knowledge graph based on the linking result of the person entity word (Andy Lau) and the work entity word (Infernal Affairs), to obtain extended information, e.g., character information of a character in the work (character Jianming Liu acted by Andy Lau in Infernal Affairs). This implementation can further extend the semantic information of the target video.

Step 104: structuring semantic information of each target video based on a relationship between the node and an edge in the knowledge graph, to obtain structured semantic information of the target video.

In the present embodiment, based on the semantic information obtained in step 103, the executing body can structure the semantic information of the target video based on the relationship between the node and the edge of the semantic information in the knowledge graph, to obtain the structured semantic information of the target video. It is understandable that the executing body can annotate the obtained structured semantic information for the target video.

Figure 2:
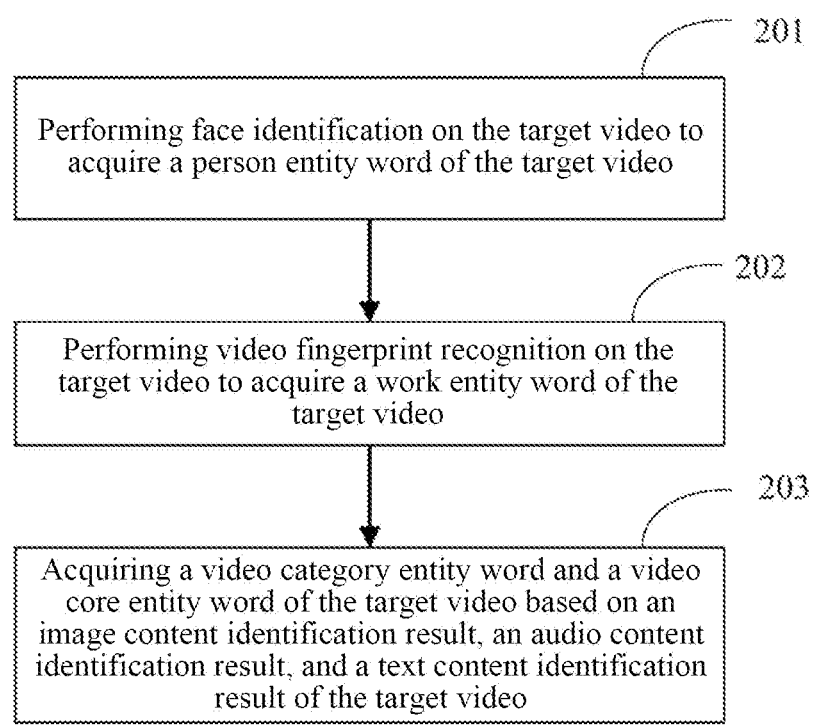
FIG. 2 is an implementation of acquiring a plurality of tag entity words from a target video in the method for generating information according to the present embodiment.

In some alternative implementations, as shown in FIG. 2, FIG. 2 shows an implementation of acquiring a plurality of tag entity words from a target video in the method for generating information according to the present embodiment. Specifically, the executing body can implement the "acquiring a plurality of tag entity words from a target video" in step 101 as follows:

Step 201: performing face identification on the target video to acquire the person entity word of the target video.

In the present implementation, the executing body can identify the target video using a face identification technology to acquire the person entity word from the target video. In this implementation, the executing body can determine whether a preset face database includes a face in the target video. If the face database includes the face in the target video, the executing body can determine the person entity word in the target video. Alternatively, the executing body may also input the target video or an image frame including a face image in the target video into a pretrained face identification model to obtain the person entity word in the target video. The face identification model may be used for characterizing a corresponding relationship between the target video or the face image included in the target video and the person entity word.

Step 202: performing video fingerprint recognition on the target video to acquire the work entity word of the target video.

In the present implementation, a video database may be preset. The video database may include a large number of complete source videos, and a work title of each source video is identified in the video database. During video fingerprint recognition, the target video may be matched with each source video in the video database, thereby determining a work title of the target video or a work title of a source video to which the target video belongs, and obtaining the work entity word of the target video.

Step 203: acquiring the video category entity word and the video core entity word of the target video based on an image content identification result, an audio content identification result, and a text content identification result of the target video.

In the present implementation, the executing body may process the target video by various approaches, thereby acquiring the video category entity word and the video core entity word of the target video. Specifically, the executing body may process an image content, an audio content, and a text content of the target video using various implementations, to obtain the video category entity word and the video core entity word of the target video. The method for acquiring a plurality of tag entity words provided in this implementation can obtain the tag entity words from the levels of perception and cognition, thereby improving the comprehensiveness of acquiring the tag entity words.

Alternatively, the executing body can extract a plurality of frames of images from the target video, and the extracted plurality of frames of images is an image content of the target video. Then, the image content of the target video (e.g., a cartoon character or a scenario appearing in the target video) is analyzed, thereby determining the video core entity word, e.g., the cartoon character, in the target video. Then, the executing body may further extract audio information from the target video, and the extracted audio information is the audio content of the target video. Then, the audio content of the target video is processed, e.g., by text conversion, and voiceprinting, thereby determining the video core entity word of the target video, e.g., a music name and a singer. Further, the executing body may further extract text information (e.g., caption information of the target video) from the target video, and the extracted text is the text content of the target video. Then, the text content of the target video is processed, e.g., by semantic analysis, thereby determining the video core entity word, e.g., lyric, of the target video. It is understandable that the video category entity word of the target video may be further determined from an identification result of at least one of the image content, the audio content, or the text content of the target video. For example, the video category entity word may be a Hongkong or Taiwan movie.

Alternatively, after acquiring a tag entity word corresponding to non-semantic information, e.g., face information or caption information, of the target video, the executing body can link the obtained tag entity word to the knowledge graph, thereby directly obtaining the work entity word, the video category entity word, the video core entity word, or the like.

It is understandable that the executing body can acquire the tag entity word of the target video from at least one of step 201, step 202, or step 203. The above step 201, step 202, and step 203 may be executed in no particular order. This is not specifically limited here. For example, the above step 201, step 202, and step 203 may also be executed in parallel.

The method for generating information provided in the above embodiments of the present disclosure can acquire a plurality of tag entity words from a target video, then link, for a tag entity word among the plurality of tag entity words, the tag entity word to a node of a preset knowledge graph, then determine semantic information of the target video based on a linking result of each of the tag entity words, and finally structure the semantic information of the target video based on a relationship between the node and an edge of the knowledge graph, to obtain structured semantic information of the target video, thereby providing structured semantic information for a video, solving the problem that a video tag is not applicable for video recommendation, search, and the like because the video tag is unstructured and lacks semantic information, and improving the efficiency and accuracy of the video in recommendation, search, and the like.

Figure 3:
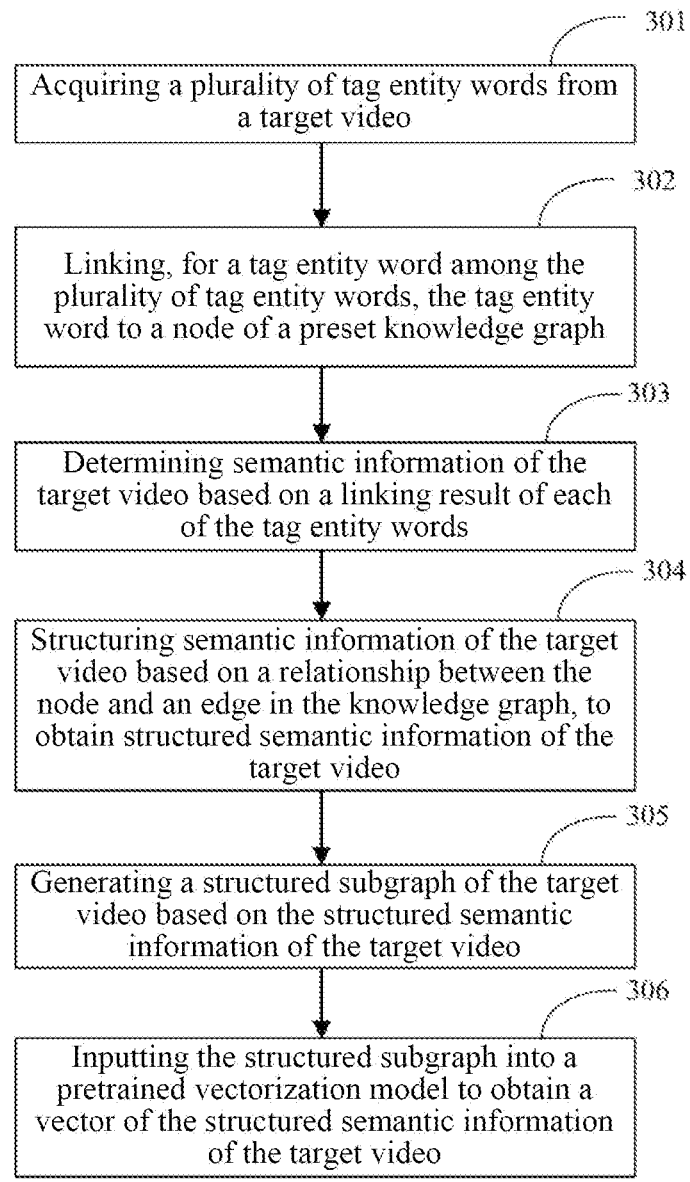
FIG. 3 is a schematic diagram of the method for generating information according to a second embodiment of the present disclosure.

Then, further referring to FIG. 3, FIG. 3 is a schematic diagram of the method for generating information according to a second embodiment of the present disclosure. The method for generating information may include the following steps:

Step 301: acquiring a plurality of tag entity words from a target video.

Step 302: linking, for a tag entity word among the plurality of tag entity words, the tag entity word to a node of a preset knowledge graph.

Step 303: determining semantic information of the target video based on a linking result of each of the tag entity words.

Step 304: structuring semantic information of the target video based on a relationship between the node and an edge in the knowledge graph, to obtain structured semantic information of the target video.

Contents included in the above step 301 to step 304 in the present embodiment are identical or similar to the contents included in step 101 to step 104 in the above embodiments. The description will not be repeated here.

Step 305: generating a structured subgraph of the target video based on the structured semantic information of the target video.

In the present embodiment, based on structured semantic information of the target video obtained in step 304, the executing body can establish the structured subgraph of the target video based on the relationship between the node and the edge of the knowledge graph. The structured subgraph may include nodes and edges, and may denote the relationship between the semantic information included in the target video based on the relationship between the node and the edge.

Step 306: inputting the structured subgraph into a pretrained vectorization model to obtain a vector of the structured semantic information of the target video.

In the present embodiment, based on the structured subgraph of the target video obtained in step 305, the executing body can input the obtained structured subgraph into the pretrained vectorization model. The vectorization model can output the vector of the structured semantic information of the target video. Here, the vectorization model may be used for characterizing a corresponding relationship between the structured subgraph and the vector of the structured semantic information. The obtained vector may be a vector representation of a structural subgraph, or may be a vector representation of a node in the structural subgraph. For example, the vector representation of the structural subgraph may be applied to a video recommendation service, and the vector representation of the node may be applied to a video search service. It is understandable that here, the executing body can train the vectorization model by various means based on actual requirements. This is not uniquely limited.

In some alternative implementations of the present embodiment, the executing body can train the vectorization model using a graph neural network (GNN). The vectorization model obtained by training with the graph neural network may be used for outputting the vector representation of the structural subgraph. For example, the graph neural network may specifically train model parameters end to end for a specific task using a graph convolutional neural network (GCN) based on an attribute and a tag of the node in the structural subgraph, thereby obtaining the vectorization model. Of course, the executing body may also train the vectorization model using a graph embedding (GE) algorithm. The vectorization model obtained by training with the graph embedding algorithm may be used for outputting the vector representation of the node in the structural subgraph. For example, the vectorization model may be specifically trained using a node vector Node2Vec as per the graph embedding algorithm. There are many paths in a network composed of nodes and edges in the structural subgraph, the paths connect nodes into a line, and these lines contain interrelationships between the nodes, just like relationships between words in a sentence. Therefore, these node sequences may be treated as sentences, and trained using a word vector word2vec, i.e., the vector representation of the node can be obtained by training with the node vector Node2Vec. This implementation can provide a vectorization model for outputting the vector representation of the structural subgraph and a vectorization model for outputting the vector representation of the node, such that diverse vectors of the structured semantic information of the target video can be outputted.

As can be seen from FIG. 3, compared with the corresponding embodiment of FIG. 1, the method for generating information in the present embodiment can obtain a corresponding structural subgraph after generating structured semantic information of a video using a knowledge graph, and obtain a vector representation of the structured semantic information of the video using a pretrained vectorization model, such that the generated structured semantic information of the video can be better applicable for video recommendation and video retrieval, thus improving the usefulness of the structured semantic information of the video.

Figure 4:
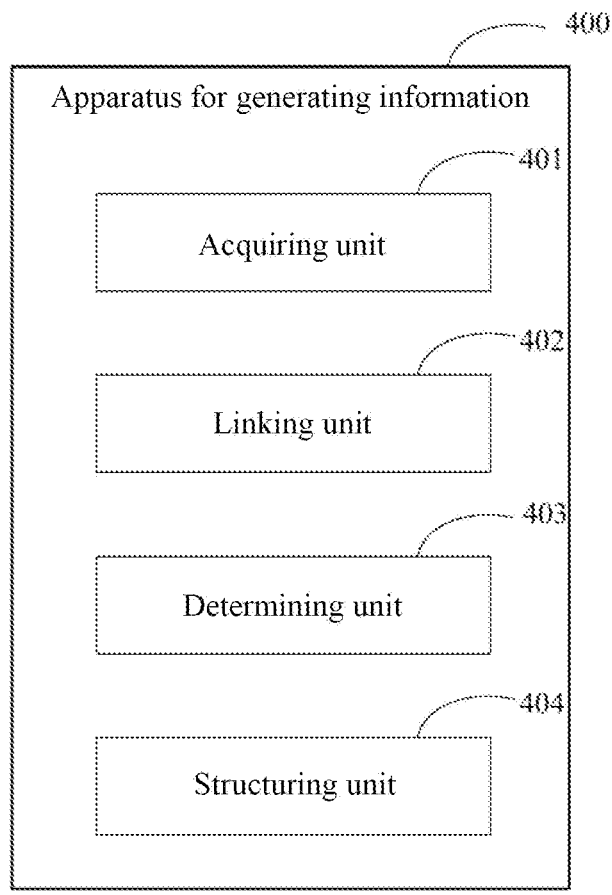
FIG. 4 is a schematic diagram of an apparatus for generating information according to an embodiment of the present disclosure.

Further referring to FIG. 4, as an implementation of the method shown in the above figures, the present disclosure provides an embodiment of an apparatus for generating information. The embodiment of the apparatus corresponds to the embodiment of the method shown in FIG. 1. The apparatus may be specifically applied to various electronic devices.

As shown in FIG. 4, the apparatus 400 for generating information of the present embodiment includes: an acquiring unit 401, a linking unit 402, a determining unit 403, and a structuring unit 404. The acquiring unit 401 is configured to acquire a plurality of tag entity words from a target video, the tag entity words including a person entity word, a work entity word, a video category entity word, and a video core entity word, the video core entity word including an entity word for characterizing a content related to the target video; the linking unit 402 is configured to link, for a tag entity word among the plurality of tag entity words, the tag entity word to a node of a preset knowledge graph; the determining unit 403 is configured to determine semantic information of the target video based on a linking result of each of the tag entity words; and the structuring unit 404 is configured to structure the semantic information of the target video based on a relationship between the node and an edge of the knowledge graph, to obtain structured semantic information of the target video.

In some alternative implementations of the present embodiment, the apparatus 400 further includes: a generating unit configured to generate a structured subgraph of the target video based on the structured semantic information of the target video; and an inputting unit configured to input the structured subgraph into a pretrained vectorization model to obtain a vector of the structured semantic information of the target video, where the vectorization model is used for characterizing a corresponding relationship between the structured subgraph and the vector of the structured semantic information.

In some alternative implementations of the present embodiment, the vectorization model is obtained by training with a graph neural network or a graph embedding algorithm.

In some alternative implementations of the present embodiment, the acquiring unit 401 is further configured to: perform face identification on the target video to acquire the person entity word of the target video; perform video fingerprint recognition on the target video to acquire the work entity word of the target video; and acquire the video category entity word and the video core entity word of the target video based on an image content identification result, an audio content identification result, and a text content identification result of the target video.

In some alternative implementations of the present embodiment, the apparatus 400 further includes: a determining unit configured to determine whether there is an irrelevant entity word among the tag entity words based on the linking result of each of the tag entity words, where the irrelevant entity word is an entity word irrelevant to the target video among the plurality of tag entity words; and a deleting unit configured to delete, in response to determining that the tag entity word is an irrelevant entity word, the irrelevant entity word.

In some alternative implementations of the present embodiment, the determining unit 403 is further configured to: acquire attribute information of each of the tag entity words based on the linking result of each of the tag entity words; extend the tag entity word as per a relationship between edges of the knowledge graph based on the linking result of each of the tag entity words, to obtain extended information of the target video; and determine the attribute information of each of the tag entity words and the extended information as the semantic information of the target video.

The units disclosed in the apparatus 400 correspond to various steps in the method described in FIG. 1. Therefore, the operations and features described above for the method also apply to the apparatus 400 and the units included therein. The description will not be repeated here.

According to an embodiment of the present disclosure, the present disclosure further provides an electronic device and a readable storage medium.

Figure 5:
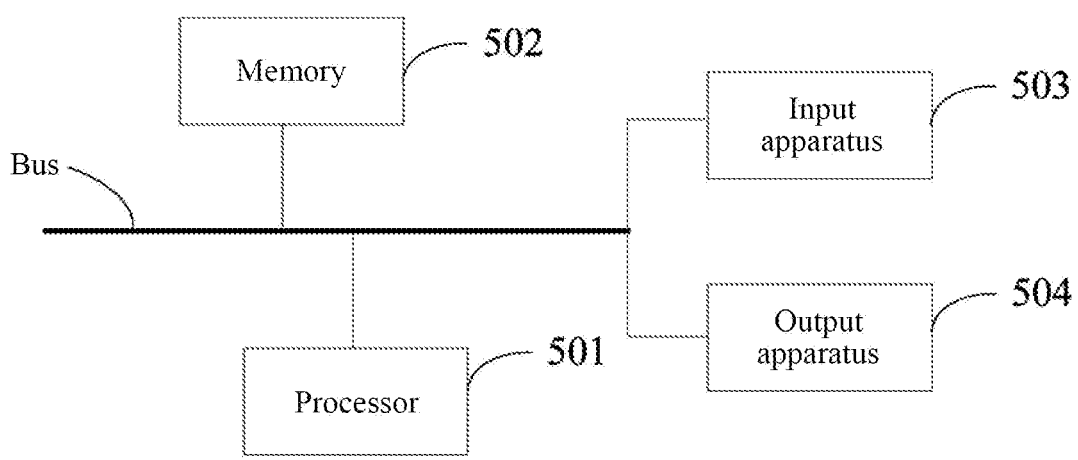
FIG. 5 is a block diagram of an electronic device configured to implement the method for generating information of embodiments of the present disclosure.

As shown in FIG. 5, a block diagram of an electronic device of the method for generating information according to embodiments of the present disclosure is shown. The electronic device is intended to represent various forms of digital computers, such as a laptop computer, a desktop computer, a workbench, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing apparatuses. The components shown herein, the connections and relationships thereof, and the functions thereof are used as examples only, and are not intended to limit implementations of the present disclosure described and/or claimed herein.

As shown in FIG. 5, the electronic device includes: one or more processors 501, a memory 502, and interfaces for connecting various components, including a high-speed interface and a low-speed interface. The various components are interconnected using different buses, and may be mounted on a common motherboard or in other manners as required. The processor can process instructions for execution within the electronic device, including instructions stored in the memory or on the memory to display graphical information for a GUI on an external input/output apparatus (e.g., a display device coupled to an interface). In other implementations, a plurality of processors and/or a plurality of buses may be used, as appropriate, along with a plurality of memories. Similarly, a plurality of electronic devices may be connected, with each device providing portions of necessary operations (e.g., as a server array, a group of blade servers, or a multi-processor system). In FIG. 5, a processor 501 is taken as an example.

The memory 502 is a non-transient computer-readable storage medium provided in the present disclosure. The memory stores instructions executable by at least one processor, such that the at least one processor executes the method for generating information provided in the present disclosure. The non-transient computer-readable storage medium of the present disclosure stores computer instructions. The computer instructions are used for causing a computer to execute the method for generating information provided in the present disclosure.

As a non-transient computer-readable storage medium, the memory 502 may be configured to store non-transient software programs, non-transient computer-executable programs and modules, such as the program instructions/modules (e.g., the acquiring unit 401, the linking unit 402, the determining unit 403, and the structuring unit 404 shown in FIG. 4) corresponding to the method for generating information in some embodiments of the present disclosure. The processor 501 runs non-transient software programs, instructions, and modules stored in the memory 502, so as to execute various function applications and data processing of a server, i.e., implementing the method for generating information in the above embodiments of the method.

The memory 502 may include a program storage area and a data storage area, where the program storage area may store an operating system and an application program required by at least one function; and the data storage area may store, e.g., data created based on use of the electronic device for generating information. In addition, the memory 502 may include a high-speed random-access memory, and may further include a non-transient memory, such as at least one magnetic disk storage component, a flash memory component, or other non-transient solid state storage components. In some embodiments, the memory 502 alternatively includes memories disposed remotely relative to the processor 501, and these remote memories may be connected to the electronic device for generating information via a network. Examples of the above network include, but are not limited to, the Internet, an intranet, a local area network, a mobile communication network, and a combination thereof.

The electronic device of the method for generating information may further include: an input apparatus 503 and an output apparatus 504. The processor 501, the memory 502, the input apparatus 503, and the output apparatus 504 may be connected through a bus or in other manners. Bus connection is taken as an example in FIG. 5.

The input apparatus 503 can receive inputted number or character information, and generate a key signal input related to user settings and function control of the electronic device for generating information, e.g., an input apparatus such as a touch screen, a keypad, a mouse, a trackpad, a touchpad, an indicating arm, one or more mouse buttons, a trackball, and a joystick. The output apparatus 504 may include a display device, an auxiliary lighting apparatus (e.g., an LED), a haptic feedback apparatus (e.g., a vibration motor), and the like. The display device may include, but is not limited to, a liquid crystal display (LCD), a light emitting diode (LED) display, and a plasma display. In some implementations, the display device may be a touch screen.

Various implementations of the systems and technologies described herein may be implemented in a digital electronic circuit system, an integrated circuit system, an ASIC (application specific integrated circuit), computer hardware, firmware, software, and/or a combination thereof. The various implementations may include: an implementation in one or more computer programs that are executable and/or interpretable on a programmable system including at least one programmable processor, which may be a special-purpose or general-purpose programmable processor, and may receive data and instructions from, and transmit data and instructions to, a storage system, at least one input apparatus, and at least one output apparatus.

These computing programs (also known as programs, software, software applications, or code) include machine instructions for a programmable processor, and may be implemented in a high-level procedural and/or object-oriented programming language, and/or in an assembly/machine language. As used herein, the terms "machine-readable medium" and "computer-readable medium" refer to any computer program product, device, and/or apparatus (e.g., a magnetic disk, an optical disk, a memory, or a programmable logic device (PLD)) configured to provide machine instructions and/or data to a programmable processor, and include a machine-readable medium receiving machine instructions as machine-readable signals. The term "machine-readable signal" refers to any signal used to provide machine instructions and/or data to a programmable processor.

To provide interaction with a user, the systems and technologies described herein may be implemented on a computer that is provided with: a display apparatus (e.g., a CRT (cathode ray tube) or a LCD (liquid crystal display) monitor) configured to display information to the user); and a keyboard and a pointing apparatus (e.g., a mouse or a trackball) by which the user can provide an input to the computer. Other kinds of apparatus may also be used to provide interaction with the user. For example, a feedback provided to the user may be any form of sensory feedback (e.g., visual feedback, auditory feedback, or haptic feedback); and an input may be received from the user in any form (including an acoustic input, a voice input, or a tactile input).

The systems and technologies described herein may be implemented in a computing system that includes a back-end component (e.g., as a data server), or a computing system that includes a middleware component (e.g., an application server), or a computing system that includes a front-end component (e.g., a user computer with a graphical user interface or a web browser through which the user can interact with an implementation of the systems and technologies described herein), or a computing system that includes any combination of such a back-end component, such a middleware component, or such a front-end component. The components of the system may be interconnected by any form or medium of digital data communication (e.g., a communication network). Examples of the communication network include: a local area network (LAN), a wide area network (WAN), and the Internet.

The computer system may include a client terminal and a server. The client terminal and the server are generally remote from each other, and usually interact through a communication network. The relationship of the client terminal and the server arises by virtue of computer programs that run on corresponding computers and have a client-server relationship with each other.

The technical solutions according to the embodiments of the present disclosure can acquire a plurality of tag entity words from a target video, then link, for a tag entity word among the plurality of tag entity words, the tag entity word to a node of a preset knowledge graph, then determine semantic information of the target video based on a linking result of each of the tag entity words, and finally structure the semantic information of the target video based on a relationship between the node and an edge of the knowledge graph, to obtain structured semantic information of the target video, thereby providing structured semantic information for a video, solving the problem of existing technologies that a video tag is not applicable for video recommendation, search, and the like because the video tag is unstructured and lacks semantic information, and improving the efficiency and accuracy of the video in recommendation, search, and the like.

It should be understood that the various forms of processes shown above can be used to reorder, add, or delete steps. For example, the steps described in the present disclosure can be executed in parallel, sequentially, or in different orders, as long as the desired results of the technical solutions disclosed in the present disclosure can be achieved. This is not limited herein.

The above specific implementations do not constitute a limitation to the protection scope of the present disclosure. It should be understood by those skilled in the art that various modifications, combinations, sub-combinations, and substitutions may be made according to the design requirements and other factors. Any modification, equivalent replacement, improvement, and the like made within the spirit and principle of the present disclosure should be included within the protection scope of the present disclosure.

What is claimed is:

1. A method for generating information, comprising:
   acquiring a plurality of tag entity words from a target video, the tag entity words comprising a person entity word, a work entity word, a video category entity word, and a video core entity word, the video core entity word comprising an entity word for characterizing a content related to the target video;
   linking, for a tag entity word among the plurality of tag entity words, the tag entity word to a node of a preset knowledge graph;
   determining semantic information of the target video based on a linking result of each of the tag entity words; and
   structuring the semantic information of the target video based on a relationship between the node and an edge of the knowledge graph, to obtain structured semantic information of the target video.

2. The method according to claim 1, wherein after the obtaining the structured semantic information of the target video, the method further comprises:
   generating a structured subgraph of the target video based on the structured semantic information of the target video; and
   inputting the structured subgraph into a pretrained vectorization model to obtain a vector of the structured semantic information of the target video, wherein the vectorization model is used for characterizing a corresponding relationship between the structured subgraph and the vector of the structured semantic information.

3. The method according to claim 2, wherein the vectorization model is obtained by training with a graph neural network or a graph embedding algorithm.

4. The method according to claim 1, wherein the acquiring the plurality of tag entity words from the target video comprises:
performing face identification on the target video to acquire the person entity word of the target video;
performing video fingerprint recognition on the target video to acquire the work entity word of the target video; and
acquiring the video category entity word and the video core entity word of the target video based on an image content identification result, an audio content identification result, and a text content identification result of the target video.

5. The method according to claim 1, wherein after the linking, for the tag entity word among the plurality of tag entity words, the tag entity word to the node of the preset knowledge graph, the method further comprises:
determining whether there is an irrelevant entity word among the tag entity words based on the linking result of each of the tag entity words, wherein the irrelevant entity word is an entity word irrelevant to the target video among the plurality of tag entity words; and
deleting, in response to determining that the tag entity word is an irrelevant entity word, the irrelevant entity word.

6. The method according to claim 1, wherein the determining the semantic information of the target video based on the linking result of each of the tag entity words comprises:
acquiring attribute information of each of the tag entity words based on the linking result of each of the tag entity words;
extending the tag entity word as per a relationship between edges of the knowledge graph based on the linking result of each of the tag entity words, to obtain extended information of the target video; and
determining the attribute information of each of the tag entity words and the extended information as the semantic information of the target video.

7. An electronic device, comprising:
at least one processor; and
a memory communicatively connected to the at least one processor; wherein
the memory stores instructions executable by the at least one processor, and the instructions are executed by the at least one processor, such that the at least one processor is configured to perform operations comprising:
acquiring a plurality of tag entity words from a target video, the tag entity words comprising a person entity word, a work entity word, a video category entity word, and a video core entity word, the video core entity word comprising an entity word for characterizing a content related to the target video;
linking, for a tag entity word among the plurality of tag entity words, the tag entity word to a node of a preset knowledge graph;
determining semantic information of the target video based on a linking result of each of the tag entity words; and
structuring the semantic information of the target video based on a relationship between the node and an edge of the knowledge graph, to obtain structured semantic information of the target video.

8. The electronic device according to claim 7, wherein after the obtaining the structured semantic information of the target video, the operations further comprise:
generating a structured subgraph of the target video based on the structured semantic information of the target video; and
inputting the structured subgraph into a pretrained vectorization model to obtain a vector of the structured semantic information of the target video, wherein the vectorization model is used for characterizing a corresponding relationship between the structured subgraph and the vector of the structured semantic information.

9. The electronic device according to claim 7, wherein the acquiring the plurality of tag entity words from the target video comprises:
performing face identification on the target video to acquire the person entity word of the target video;
performing video fingerprint recognition on the target video to acquire the work entity word of the target video; and
acquiring the video category entity word and the video core entity word of the target video based on an image content identification result, an audio content identification result, and a text content identification result of the target video.

10. The electronic device according to claim 7, wherein after the linking, for the tag entity word among the plurality of tag entity words, the tag entity word to the node of the preset knowledge graph, the operations further comprise:
determining whether there is an irrelevant entity word among the tag entity words based on the linking result of each of the tag entity words, wherein the irrelevant entity word is an entity word irrelevant to the target video among the plurality of tag entity words; and
deleting, in response to determining that the tag entity word is an irrelevant entity word, the irrelevant entity word.

11. The electronic device according to claim 7, wherein the determining the semantic information of the target video based on the linking result of each of the tag entity words comprises:
acquiring attribute information of each of the tag entity words based on the linking result of each of the tag entity words;
extending the tag entity word as per a relationship between edges of the knowledge graph based on the linking result of each of the tag entity words, to obtain extended information of the target video; and
determining the attribute information of each of the tag entity words and the extended information as the semantic information of the target video.

12. A non-transient computer-readable storage medium storing computer instructions, wherein the computer instructions when executed by a computer, cause the computer to perform operations comprising:
acquiring a plurality of tag entity words from a target video, the tag entity words comprising a person entity word, a work entity word, a video category entity word, and a video core entity word, the video core entity word comprising an entity word for characterizing a content related to the target video;
linking, for a tag entity word among the plurality of tag entity words, the tag entity word to a node of a preset knowledge graph;

determining semantic information of the target video based on a linking result of each of the tag entity words; and structuring the semantic information of the target video based on a relationship between the node and an edge of the knowledge graph, to obtain structured semantic information of the target video.

13. The non-transient computer-readable storage medium according to claim 12, wherein after the obtaining the structured semantic information of the target video, the operations further comprise:

generating a structured subgraph of the target video based on the structured semantic information of the target video; and inputting the structured subgraph into a pretrained vectorization model to obtain a vector of the structured semantic information of the target video, wherein the vectorization model is used for characterizing a corresponding relationship between the structured subgraph and the vector of the structured semantic information.

14. The non-transient computer-readable storage medium according to claim 12, wherein the acquiring the plurality of tag entity words from the target video comprises:

performing face identification on the target video to acquire the person entity word of the target video;

performing video fingerprint recognition on the target video to acquire the work entity word of the target video; and acquiring the video category entity word and the video core entity word of the target video based on an image content identification result, an audio content identification result, and a text content identification result of the target video.

15. The non-transient computer-readable storage medium according to claim 12, wherein after the linking, for the tag entity word among the plurality of tag entity words, the tag entity word to the node of the preset knowledge graph, the operations further comprise:

determining whether there is an irrelevant entity word among the tag entity words based on the linking result of each of the tag entity words, wherein the irrelevant entity word is an entity word irrelevant to the target video among the plurality of tag entity words; and deleting, in response to determining that the tag entity word is an irrelevant entity word, the irrelevant entity word.

16. The non-transient computer-readable storage medium according to claim 12, wherein the determining the semantic information of the target video based on the linking result of each of the tag entity words comprises:

acquiring attribute information of each of the tag entity words based on the linking result of each of the tag entity words;

extending the tag entity word as per a relationship between edges of the knowledge graph based on the linking result of each of the tag entity words, to obtain extended information of the target video; and determining the attribute information of each of the tag entity words and the extended information as the semantic information of the target video.

* * * * *